US012624723B2

(12) United States Patent
Keßler et al.

(10) Patent No.: US 12,624,723 B2
(45) Date of Patent: May 12, 2026

(54) FASTENING DEVICE FOR ARTICULATED FASTENING OF A FIRST CONSTRUCTION UNIT TO A SECOND CONSTRUCTION UNIT

(71) Applicant: Stabilus GmbH, Koblenz (DE)

(72) Inventors: Jonathan Keßler, Gemünden (DE);
Axel Knopp, Eitelborn (DE); Thorsten Müller, Rhens (DE); Bernd Arenz, Herschbroich (DE)

(73) Assignee: Stabilus GmbH, Koblenz (DE)

( * ) Notice: Subject to any disclaimer, the term of this patent is extended or adjusted under 35 U.S.C. 154(b) by 393 days.

(21) Appl. No.: 18/334,616

(22) Filed: Jun. 14, 2023

(65) Prior Publication Data

US 2024/0003381 A1     Jan. 4, 2024

(30) Foreign Application Priority Data

Jun. 30, 2022     (DE) ...................... 10 2022 116 310.5

(51) Int. Cl.
F16C 11/06 (2006.01)
(52) U.S. Cl.
CPC ................................ F16C 11/0657 (2013.01)
(58) Field of Classification Search
CPC .............. F16C 11/0623; F16C 11/0628; F16C 11/0633; F16C 11/0638; F16C 11/0657;
(Continued)

(56) References Cited

U.S. PATENT DOCUMENTS 3,253,330 A * 5/1966 Davies ................ F16C 11/0623
29/898.044
3,253,845 A * 5/1966 Davies ................ F16C 11/0623
29/898.044
(Continued)

FOREIGN PATENT DOCUMENTS

DE 102004040170 A1 3/2006
DE 202006006792 U1 7/2006
(Continued)

OTHER PUBLICATIONS

German Application No. 102022116310.5, "Search Report", May 12, 2023, 6 pages.

*Primary Examiner* — Amber R Anderson
*Assistant Examiner* — Kevin J Baynes
(74) *Attorney, Agent, or Firm* — Kilpatrick Townsend & Stockton LLP

(57) ABSTRACT

A fastening device for the articulated fastening of a first construction unit, e.g., a drive device which can be varied in length by motor, to a second construction unit, e.g., a motor vehicle. The fastening device comprises a ball pin with a bolt shaft defining a bolt axis. One end of the bolt shaft is configured for fastening to the second construction unit and the other end comprises a ball head mounted in a ball socket of a ball socket unit. An attachment unit attaches the ball socket unit to the first construction unit. The ball socket unit has two integral contact portions, which are diametrically opposed to one another with respect to the bolt axis and are in contact with the bolt shaft. The contact portions may each be provided with an indentation area, such that they are elastically deformable in a direction away from the bolt shaft.

11 Claims, 1 Drawing Sheet

(58) Field of Classification Search
CPC ................ F16C 11/069; F16C 11/0695; Y10T
403/32737
See application file for complete search history.

(56) References Cited

U.S. PATENT DOCUMENTS

| | | | | |
|---|---|---|---|---|
| 3,909,084 | A | * | 9/1975 | Snidar ................. F16C 11/0619 |
| | | | | 403/135 |
| 4,111,570 | A | * | 9/1978 | Morel ................. F16C 11/0657 |
| | | | | 403/321 |
| 4,118,131 | A | * | 10/1978 | Schnitzius ............... F16F 9/54 |
| | | | | 403/141 |
| 4,311,405 | A | * | 1/1982 | Hawley .............. F16C 11/0623 |
| | | | | 403/164 |
| 4,571,110 | A | * | 2/1986 | Amrath .............. F16C 11/0657 |
| | | | | 403/143 |
| 4,895,472 | A | * | 1/1990 | Dony ................. F16C 33/1065 |
| | | | | 403/135 |
| 5,409,320 | A | * | 4/1995 | Maury .................. B60G 7/005 |
| | | | | 403/77 |
| 5,577,836 | A | * | 11/1996 | Vent .................... B60Q 1/0683 |
| | | | | 403/329 |
| 7,384,209 | B2 | * | 6/2008 | Muders .............. F16C 11/0614 |
| | | | | 403/56 |

| | | | | |
|---|---|---|---|---|
| 8,602,674 | B2 | * | 12/2013 | Loewe ................ F16C 11/0623 |
| | | | | 403/135 |
| 9,140,293 | B2 | * | 9/2015 | Schilz ................... F16B 21/088 |
| 9,291,194 | B2 | * | 3/2016 | Strobel ............... F16C 11/0638 |
| 9,987,972 | B2 | * | 6/2018 | Burton ............... F16C 11/0657 |
| 9,995,331 | B2 | * | 6/2018 | Heimann ............. F16C 11/069 |
| 10,220,666 | B2 | * | 3/2019 | Kuroda ............... B60G 21/055 |
| 11,022,171 | B2 | * | 6/2021 | Burton ............... F16C 11/0685 |
| 11,635,184 | B2 | * | 4/2023 | Fladhammer ....... F16C 11/0685 |
| | | | | 403/122 |
| 2007/0031185 | A1 | * | 2/2007 | Bertram ................ F16B 21/075 |
| | | | | 403/122 |
| 2007/0253765 | A1 | * | 11/2007 | Knopp ............... F16C 11/0638 |
| | | | | 403/122 |
| 2014/0137477 | A1 | | 5/2014 | et al. |
| 2025/0243898 | A1 | * | 7/2025 | Goeller ............... F16C 11/0623 |

FOREIGN PATENT DOCUMENTS

| | | | | | |
|---|---|---|---|---|---|
| DE | 102012214674 | A1 | | 2/2014 | |
| DE | 102017006742 | A1 | * | 1/2018 | ......... F16C 11/0685 |
| JP | 59077120 | A | * | 5/1984 | ......... F16C 11/0657 |
| WO | WO-2014005681 | A1 | * | 1/2014 | ........... F16C 11/069 |
| WO | WO-2014005712 | A1 | * | 1/2014 | ......... F16C 11/0695 |
| WO | WO-2017147629 | A1 | * | 8/2017 | ......... F16C 11/0623 |

* cited by examiner

FASTENING DEVICE FOR ARTICULATED FASTENING OF A FIRST CONSTRUCTION UNIT TO A SECOND CONSTRUCTION UNIT

CROSS REFERENCE TO RELATED APPLICATION

This application claims priority to German Patent Application No. 10 2022 116 310.5, filed in Germany on Jun. 30, 2022, the entire contents of which are hereby incorporated herein by this reference.

TECHNICAL FIELD

The present invention relates to a fastening device for the articulated fastening of a first construction unit, in particular a drive device which can be varied in length by motor, to a second construction unit, in particular a motor vehicle, comprising a ball pin with a bolt shaft which defines a bolt axis and whose one end is intended for fastening to the second construction unit, while at its other end a ball head is provided, and a ball socket unit with a ball socket in which the ball head is mounted, and an attachment unit which is intended for attaching the ball socket unit to the first construction unit, wherein the ball socket unit has two integral contact portions which are diametrically opposite to one another with respect to the bolt shaft and are in contact with the bolt shaft.

SUMMARY

Such fastening devices with ball joint are used in particular in motor vehicle technology, for example in the field of motor-driven opening and closing devices of pivotable flaps, preferably tailgates, doors or similar. In this case, the opening and closing force is provided by a drive device which can be changed in length by motor and which, for example, comprises a engine-transmission assembly and a spindle assembly which converts a rotational movement about the longitudinal axis of the drive device into an axial extension or shortening movement. A fastening device comprising a ball joint is provided at one end, preferably at both ends, of the drive device, wherein the axis of the bolt shaft of the ball pin extends substantially parallel to the pivot axis of the pivotable flap. In principle, conventional hinges which have a fastening plate with a bore penetrated by a hinge bolt could also be used, as is known, for example, from DE 10 2004 040 170 A1. However, the use of ball joints has the advantage of a high tolerance to movement components that deviate from the strict pivoting movement about the pivot axis and, for example, are structurally unavoidable or occur as a result of different thermal expansion coefficients of the materials used.

In the case of drive devices with an engine-transmission assembly and a spindle assembly that are variable in length by motor, the torque generated by the motor and transmitted to the spindle or the spindle nut must be supported in such a manner that the respective other component of the spindle assembly, namely the spindle nut or the spindle, does not rotate freely, but remains rotationally fixed with respect to a housing accommodating the engine-transmission assembly, in such a manner that the desired axial movement results. This torque support takes up radial installation space and thus increases the installation space required for the drive device.

In order to overcome this disadvantage and to enable a space-saving design of such a drive device, it has been proposed, for example, in DE 10 2012 214 674 A1, to carry out the torque support outside the actual drive device and, in particular, to displace it into the fastening device by providing the ball socket unit with the contact portions mentioned above, which take over this task.

However, it becomes evident in this process that in some applications of such fastening devices, undesired noise in the form of a clicking or rattling can occur, for example when the already mentioned tailgate driven by a drive device that is variable in length by motor of a vehicle is moved manually in opposite directions.

This noise generation is based on the fact that the torque situation on the ball socket unit changes in the described movement forms, in such a manner that the contact portions supporting the torque come into contact with the ball pin. Although the approach to choose the distance between the contact portions and the ball pin as small as possible has been pursued in DE 10 2012 214 674 A1, it is possible, for example, for a significant impact of the ball pin to occur on the contact portions even under these circumstances due to elastic deformation of the corresponding components, as a result of which the undesired noise generation mentioned is explained.

Although it has also been proposed in DE 10 2012 214 674 A1 to provide a separate elastic buffer element, preferably a rubber buffer, between the contact portions and the bolt shaft, this represents a significant additional outlay in the manufacture of the corresponding fastening device, and there is the risk that such buffer elements become brittle over time and the desired function can no longer be sufficiently fulfilled.

Accordingly, it is the object of the present invention to further develop a generic fastening device of the type described above in such a manner that noise generation is reliably prevented even in the case of changing torques, while at the same time a simple production and a long service life of the device are ensured.

For this purpose and for solving this object, the contact portions are each provided with an indentation area in the fastening device according to the invention, in such a manner that they are elastically deformable in a direction away from the bolt shaft. This measure ensures that, in the case of changing torques and ultimately even in the case of an impact of the ball pin on the corresponding contact portion, damping of the latter is made possible, which minimizes the noise occurring. By further forming the contact portions integrally with the ball socket unit, the additional provision of a buffer element can be dispensed with. Furthermore, the provision of the indentation areas simultaneously forms an opposite limitation for the deflection of the contact portions, in such a manner that excessive deformation and possible damage to the contact portions is also prevented. In this case, it should not be ruled out that the device according to the invention can also be designed as multiple pieces, such that, for example, the contact portions could be produced from a different material than the rest of the ball socket unit, should this be necessary.

In a preferred development of the present invention, the contact portions can be formed to exert a biasing force in the direction of the bolt shaft. This ensures that the contact portions are in contact with the bolt shaft at any time, whereby the occurrence of noise in the event of an impact of the bolt shaft on the contact portions is prevented even more reliably.

Further, in the fastening device according to the invention, respective web portions can be provided in the indentation areas which are arranged to restrict the elastic deformation of the contact portions in the direction away from the bolt shaft. Such web portions enable a precise adjustment of the possible deflection and thus of the deformation of the contact portions, in order to prevent possible damage to it in the manner already mentioned briefly above.

While in principle different materials are suitable for producing the individual components of the device according to the invention, the ball socket unit can in particular be made of a plastic, preferably a polyamide, in particular PA66. Such plastics are, on the one hand, available and workable easily and cost-effectively and, on the other hand, have suitable mechanical properties for many conceivable applications. In particular, the desired deformability of the contact portions is easily achieved by means of such plastics, while the ball socket unit as a whole can nevertheless have sufficient stability and strength.

Notwithstanding the specifically used material, the ball socket unit can be produced by means of an injection molding process, whereby in particular the formation of the indentation areas is simplified. The formation of the contact portions in such a manner that they exert a pre-loading force in the direction of the bolt shaft is also easily possible with this manufacturing technique.

In contrast, the ball pin can be produced from a metal material or a metal alloy in the device according to the invention, as a result of which sufficient strength and other desired mechanical properties can also be ensured.

BRIEF DESCRIPTION OF THE DRAWINGS

Further features and advantages of the present invention will become even clearer from the following description of an embodiment, when said embodiment is considered together with the accompanying drawings. In detail, the drawings show.

DETAILED DESCRIPTION

Figures 1, 2:
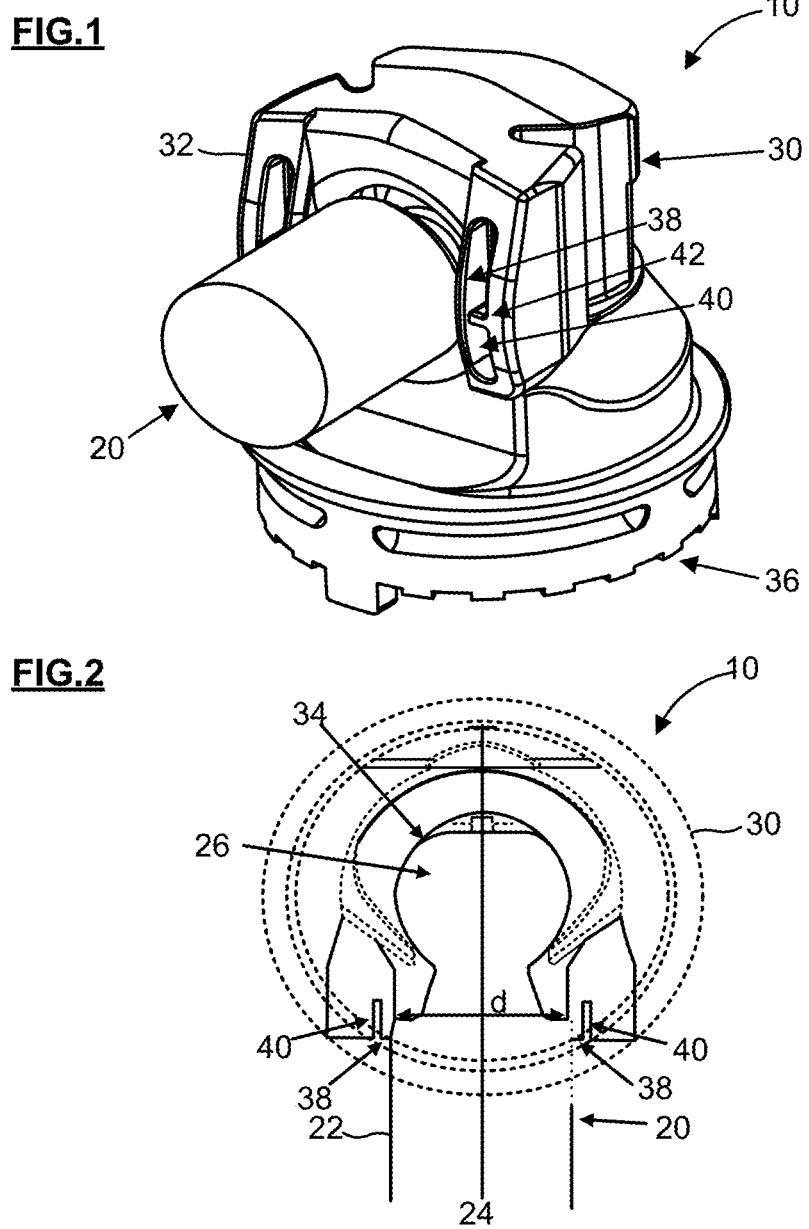
FIG. 1 a schematic view of a fastening device according to the invention.
FIG. 2 a detailed view of the fastening device from FIG. 1.

In FIG. 1, a fastening device according to the invention for the articulated fastening of a first construction unit to a second construction unit is initially shown in an isometric view and is generally denoted by the reference numeral 10. The same device 10 is also shown in FIG. 2 in a sectional view, the sectional plane being in the horizontal with respect to the illustration from FIG. 1.

Such fastening devices are used, for example, in the automotive field for attaching variable-length drive devices, which are provided for the motorized opening and closing of doors or flaps, for example tailgates. An extensive description of such a drive device is to be dispensed with at this point and, rather, reference is made, for example, to DE 10 2012 214 674 A1, which describes such a device in detail.

The fastening device 10 according to the invention on the one hand comprises a ball pin 20 with a bolt shaft 22 which defines a bolt axis 24. The bolt shaft 22 is also provided with a ball head 26 at one end. The end of the ball pin 20, which is not shown in the figures and is opposite the ball head 26, is provided for fastening to the mentioned second construction unit, that is to say in the illustrated example to a motor vehicle.

On the other hand, the fastening device 10 comprises a ball socket unit with a body 32 which defines a ball socket 34 in which the ball head 26 of the ball pin 20 is mounted.

Furthermore, the ball socket unit 30 comprises an attachment unit 36 which is provided for attaching the ball socket unit 30 to the first construction unit, that is to say in the cited example to the variable-length drive device.

In contrast to other types of fastening devices known from the prior art, the fastening device 10 shown and described here also brings about a support of torques in addition to the pure connection of the two construction units. This is necessary in order to, for example, prevent a corresponding spindle nut from rotating easily during a rotation of a threaded spindle of the variable-length drive unit, and thus to enable the length adjustability of the drive device at all.

In order to accomplish this functionality, the ball socket unit 30 also has, on its body 32, two integral contact portions 38, which are diametrically opposite one another with respect to the pin axis 24 and are in contact with the bolt shaft 22. For this purpose, the contact portions 38 are provided with respective indentation areas 40, wherein the contact portions 38 are further formed in such a manner that they exert a biasing force in the direction of the bolt shaft 22. This can be achieved in particular by virtue of the fact that, in a manufacturing process, that is to say for example an injection molding process, of the body 32 of the ball socket unit 30, the contact portions 38 are formed at a smaller distance from one another than the distance d shown in FIGS. 1 and 2. In this manner, the system parts 38 are already pressed apart by the bolt shaft 22 after its installation, compared to an unbiased condition, and thus are continually in contact with the bolt shaft 22 due to the resulting elastic pre-loading force. This prevents a brief loss of contact with the bolt shaft 22 during a change of an applied torque of one of the contact portions 38, and subsequently an impact of the bolt shaft 22 on the corresponding contact portion 38 occurring again. Accordingly, the generation of noises during the operation of the fastening device 10 can be reliably prevented while the integral provision of the contact portions 38 in the ball socket unit 30 further makes it easy and cost-effective to produce, for example in the context of the injection molding, and further components can be dispensed with as buffer elements.

Finally, reference is also made to the web portions 42 which are only visible in FIG. 1 and are provided in the indentation areas 40 in order to restrict respective elastic deformations of the contact portions in the direction away from the bolt axis 24 and thus to counteract possible damage to the contact portions 38 as a result of excessively large deflections and deformations.

The invention claimed is:

1. A fastening device for the articulated fastening of a first construction unit to a second construction unit, comprising:
   a ball pin having a bolt shaft which defines a bolt axis, wherein one end of the bolt shaft is configured to be fastened to the second construction unit, and the other end of the bolt shaft comprises a ball head, wherein the bolt shaft and the ball head are separated by a neck region; and
   a ball socket unit comprising a ball socket, in which the ball head is mounted, and an attachment unit configured to attach the ball socket unit to the first construction unit,
   wherein the ball socket unit further comprises two integral contact portions in contact with the bolt shaft but not the ball head or the neck region, each contact portion comprising an indentation area and configured to be elastically deformable in a direction away from the bolt shaft.

2. The fastening device of claim 1, wherein the contact portions are configured to exert a biasing force in a direction toward the bolt shaft.

3. The fastening device of claim 1, wherein the indentation areas further comprise respective web portions configured to restrict the elastic deformation of the contact portions-in the direction away from the bolt shaft.

4. The fastening device of claim 1, wherein the ball socket unit is made of a plastic.

5. The fastening device of claim 4, wherein the ball socket unit is made of a polyamide.

6. The fastening device of claim 5, wherein the ball socket unit is made of PA66.

7. The fastening device of claim 1, wherein the ball socket unit is produced by an injection molding process.

8. The fastening device of claim 1, wherein the ball pin is comprised of at least one of a metal material or a metal alloy.

9. The fastening device of claim 1, wherein the first construction unit is a drive device which can be varied in length by a motor.

10. The fastening device of claim 1, wherein the second construction unit is a motor vehicle.

11. The fastening device of claim 1, wherein the contact portions of the ball socket unit are diametrically opposite one another with respect to the bolt axis.

* * * * *